US010122684B1

(12) United States Patent
Carlson et al.

(10) Patent No.: US 10,122,684 B1
(45) Date of Patent: Nov. 6, 2018

(54) LOCAL AREA NETWORK ELECTRONIC PERIMETER SECURITY

(71) Applicant: Cipherloc Corporation, Buda, TX (US)

(72) Inventors: Albert Henry Carlson, Buda, TX (US); Robert LeBlanc, Buda, TX (US); Carlos Gonzales, Buda, TX (US)

(73) Assignee: Cipherloc Corporation, Buda, TX (US)

( * ) Notice: Subject to any disclaimer, the term of this patent is extended or adjusted under 35 U.S.C. 154(b) by 200 days.

(21) Appl. No.: 15/355,741

(22) Filed: Nov. 18, 2016

(51) Int. Cl.
*G06F 21/00* (2013.01)
*H04L 29/06* (2006.01)

(52) U.S. Cl.
CPC .................. *H04L 63/0209* (2013.01)

(58) Field of Classification Search
None
See application file for complete search history.

(56) References Cited

U.S. PATENT DOCUMENTS

| | | | | |
|---|---|---|---|---|
| 4,295,132 A * | 10/1981 | Burney | ............... | G08B 29/046 307/652 |
| 8,981,895 B2 * | 3/2015 | Bush | .................. | H04L 63/1416 340/3.1 |
| 9,178,514 B1 * | 11/2015 | Carlson | ............. | H03K 19/0175 |
| 2007/0266447 A1 * | 11/2007 | Hollander | ............... | G06F 21/32 726/34 |
| 2013/0344844 A1 * | 12/2013 | Goldfarb | ............ | H04L 63/1408 455/411 |
| 2015/0113309 A1 * | 4/2015 | Grieco | ................ | G06F 11/3062 713/340 |
| 2015/0200934 A1 * | 7/2015 | Naguib | ................ | G06F 21/575 713/2 |
| 2015/0222632 A1 * | 8/2015 | Ichijo | .................. | H04L 63/0876 726/7 |
| 2018/0069874 A1 * | 3/2018 | Saeki | .................... | B60R 16/023 |

* cited by examiner

*Primary Examiner* — Shin-Hon (Eric) Chen
(74) *Attorney, Agent, or Firm* — Richard L. Moseley

(57) ABSTRACT

An apparatus and method for monitoring the physical wiring plant of a computer local area network (LAN) in order to detect the presence of extraneous electronic circuitry placed onto that physical wiring which were not originally designed as part of the electronic circuitry of that LAN and reporting the presence of that additional electronic circuitry and taking action against that additional electronic circuitry based on user directive. The LAN asset being monitored could consist of a single device such as a computer, cell phone, credit card machine, network interface card, printer/scanner, server, router, modem, etc. or an entire network of many such devices.

14 Claims, 14 Drawing Sheets

LOCAL AREA NETWORK ELECTRONIC PERIMETER SECURITY

BACKGROUND OF THE INVENTION

The "Internet of Everything" (IoE) is the most hyped "emerging technology" today and represents a huge opportunity for a new breed of criminals ("Hackers") who use the computer to attack their victims by forcing their way (disrupting communications, altering access or issuing false commands/data) into our Critical Infrastructure segments, businesses, healthcare, educational facilities, governments and our personal lives. This makes protecting these facilities and their associated electronic based assets (digital computers) from electronic attack vitally important. Unfortunately, traditional security efforts for such facilities and electronic assets have resulted in only protecting the entity from the curious rather than from determined Intruders. Making matters worse, a more sophisticated and capable class of Intruder has emerged and protection of these facilities and their electronic assets requires a different approach and level of protection.

Protecting a facility and its electronic based assets is a time consuming and never ending effort. New attacks are developed regularly and the attacker generally has the edge. In computer and network security situations the security professionals attempt to protect all portions of the network from attack. Starting with the network perimeter, the defender tries to prevent network intrusion and then breaks the network into defendable chunks. Specific attack vectors, such as malware, viruses, and spoofing are addressed. The final result is an integrated and coordinated defensive perimeter and systematic approach that discourages and turns back attacks and is similar to the military concept of setting up a secure perimeter which consists of three general steps for "keeping the bad guys out" physically, electronically, and organizationally:

(1) Keep the bad guys out (of your physical perimeter)—Protect your perimeter from external intrusion. Physical access is often the easiest and most effective way to penetrate an organization. Hackers use this approach because physical access means "owning" the equipment. If the equipment cannot be taken over, it can be damaged or stolen, often with the same result and without the effort required to create, test, debug, and run an electronic hack.

(2) Keep the bad guys out (of your electronic perimeter)—Protect your electronic perimeter from intrusion. Electronic access allows information theft from a remote location and is typically a second step if physical access is denied or is impractical.

(3) Keep the bad guys out (of your organization)—Protect your organization. Scrutiny and constant evaluation of personnel inside the organization is required to ensure that the organization has not been infiltrated or that a worker has not been convinced to attack from the inside.

Hackers have gotten more sophisticated and capable over the years and have developed many methods of attack for penetrating the physical perimeter and the electronic perimeter defenses and once inside, obtaining the information being protected. This has led to the ever increasing use of data/information encryption techniques which make the information hard, if not impossible, for a hacker to read. This is done via cryptography by using encryption algorithms and a secret "key", one that is hard to guess to ensure secrecy that is shared by those people who are legitimate parties to the data. "Conventional Wisdom" in cryptography says that modern ciphers, like AES, have large combinatoric key spaces, so that extensive effort, usually in the form of a "Brute Force" attack, is expended and it is statistically improbable to break the cipher in a "reasonable time." But messages encrypted using these ciphers have been, and are, readily broken because the solution space is not as large as previously thought due to the existence of equivalent keys that give rise to "isomorphs", repetition and language patterns and/or the ciphers are susceptible to heuristic attacks.

Clearly, keeping the bad guys out of the physical perimeter of a network, the electronic perimeter of a network, including the devices themselves, and securing the data within the network through the use of various obscuring techniques are top priorities in today's modern world of ever increasing computing power and sophistication.

The present invention is directed at improving protection for the electronic perimeter of a computing environment, starting with a single node computing device and extending to the point of connection to an external network.

OVERVIEW OF THE INVENTION

Today's modern lifestyle depends on digital computer systems and those systems are vulnerable to attacks that disrupt communications, alter/access data, or issue false commands/data. Disrupting communications hampers the ability of the system to react to changing conditions. If that reaction is delayed too long, the asset or facility may not be able to alter its' operation in time to prevent a service outage or damage to the equipment. Altering and accessing data allows the system to react correctly but changes the situation perceived by the controlling computer to be one which does not exist or simply supplies the Intruder with sensitive information. Finally, issuing false commands tells the system to alter its state to react the wrong way, potentially resulting in damage to the system or, loss of service or loss of life. For example, one type of attack that issues false commands is the "replay" attack in which a hacker records commands sent by the network and then replays it on the network. This attack is very effective because the hacker does not have to decrypt the message; he merely observes the effect of the traffic. Replay attacks can be used over and over until the system rejects those messages.

CipherLoc® Local Area Network Electronic Perimeter Security

In today's world of modern computing, protecting the "Electronic Perimeter" of computers and associated infrastructure mostly consists of the electrical and electronic equipment's circuits being protected by devices that must be installed to comply with safety and performance standards before the end products can be sold or used.

Traditional, commercially available circuit protection devices interrupt overcurrent events and divert overvoltage transients. They increase safety and enable end products to survive harsh electrical conditions. In addition, commercially available, strategically selected protection devices are offered that will:

Improve end-product uptime, sustainability and reliability
Assure low warranty return, repair and replacement costs
Minimize fire and shock risks and larger damage potential
Minimize operating dangers and potential liabilities Going a step further, The North American Electric Reliability Corporation (NERC), a self-regulatory organization, subject to oversight by the U.S. Federal Energy Regulatory Commission and governmental authorities in Canada, develops, releases and maintains Critical Infrastructure Protection Cyber Security Standards (CIP Cyber Security Standards or simply CIP). Presently these number from CIP-002 through CIP-009. "CIP-005: Electronic Security Perimeter(s)" specifically requires the identification and protection of the Electronic Security Perimeter(s) inside which all Critical Cyber assets (computers, routers, switches, modems, firewalls, etc.) reside as well as all access points on the perimeter. The standard goes on to require "any non-critical Cyber Asset within a defined Electronic Security Perimeter shall be identified and protected pursuant to the requirements of Standard CIP-005." Organizations spend a great deal of time and money in an effort to comply with such regulations and standards.

Much effort has gone into the above types of activities and products in an effort to protect network and computing assets from harm.

The CipherLoc® Local Area Network Electronic Perimeter Security (CL-EPS or EPS) is designed to specifically detect unauthorized electronic circuit monitoring and/or snooping of a computer network's wiring and to help prevent intrusion.

DETAILED DESCRIPTION

Introduction

Figure 1A:
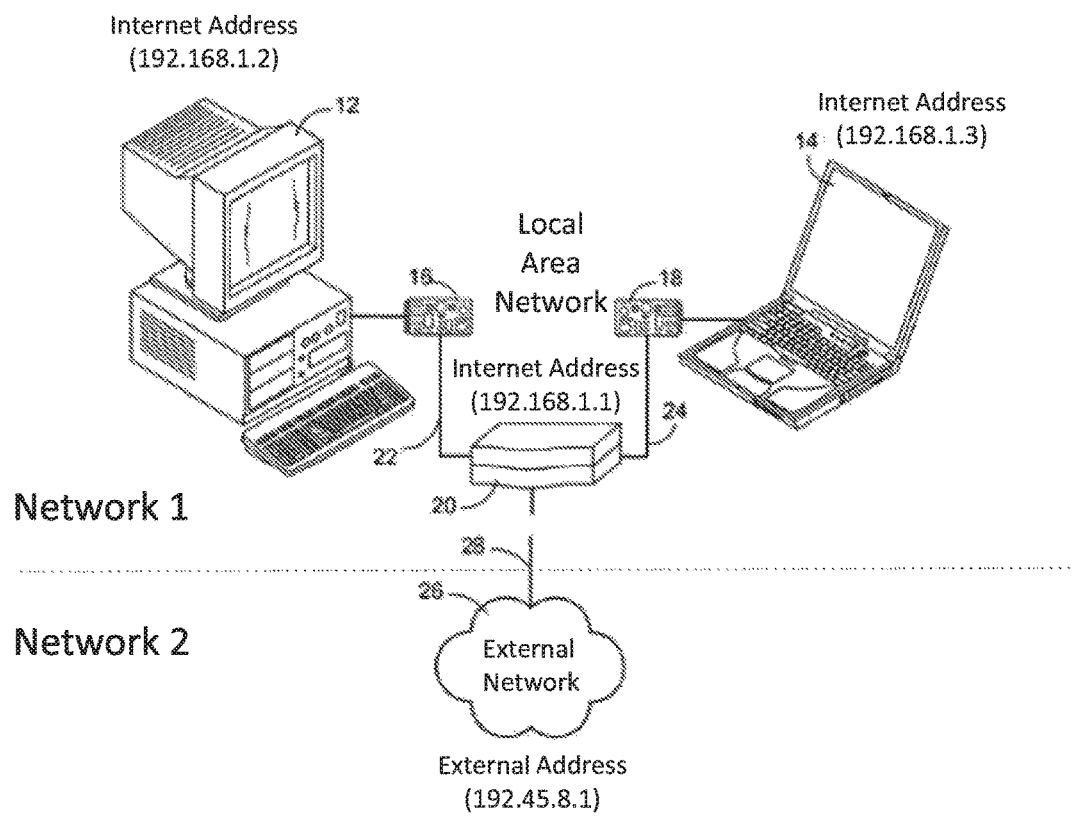
FIG. 1A is a schematic diagram of a typical computer network in which various embodiments of the present invention may be implemented.

Embodiments of the present invention involve monitoring the physical wiring plant of a computer local area network (LAN) in order to detect the presence of extraneous electronic circuitry placed onto that physical wiring which were not originally designed as part of the electronic circuitry of that LAN and reporting the presence of that additional electronic circuitry and taking action against that additional electronic circuitry based on user directive. The LAN asset being monitored could consist of a single device such as a computer, cell phone, credit card machine, network interface card, printer/scanner, server, router, modem, etc. or an entire network of many such devices. FIG. 1A illustrates such a collection of devices shown as items 12, 14, 16, 18, 20, 22, 24 and 28 within a network.

Terms:

Network or Computer Network—refers to a group of computing hardware devices, such as laptop computers, desktop computers and servers, that are linked together through physical wiring, special purpose electronic devices and connections that offer electronic communication channels to facilitate communications between the computing hardware and to share resources among a wide range of users. Networks are commonly categorized based on their characteristics.

Local Area Network—refers to computer network that interconnects computers within a limited area such as a residence, school, laboratory, university campus or office building and has its network equipment and interconnects locally managed. It is commonly referred to as a LAN.

External Network—refers to a dynamic network that includes all network addresses not explicitly included in any other network. The network definition changes dynamically when other networks are defined and modified. It cannot be directly modified or deleted. The External network generally represents the Internet.

External Port—refers to a connection point or interface between a computer and an external device such as modems, printers, mice and other devices.

Node—refers to a basic unit used in computer science that are devices or data points on a larger network used either as a connection point, a redistribution point, or a communication endpoint. Devices such as a personal computer, cell phone, printers and data terminal equipment are nodes.

Module—in computer terms, refers to a selection of independent electronic circuits packaged onto a circuit board to provide a basic function within a computer. An example might be an inverter or flip-flop, which would require two or more transistors and a small number of additional supporting devices.

Generator—in computer science, a generator is a special routine that can be used to control the iteration behavior of a loop and can be hardware, firmware or software based. In fact, all generators are iterators.

Electronic Communications—means any transfer of signs, signals, writing, images, sounds, data, or intelligence of any nature transmitted in whole or in part by a wire, radio, electromagnetic, photo-electronic or photo-optical system.

Data Stream and Network Communication—refers to all electronic communication between a network of two or more devices.

Obscuring—altering network communications from an expected form. This can include encrypting. It can also include altering the manner in which the network communication is transmitted. Multiple methods may be employed to obscure the same network communication. A number of possible methods for obscuring will be described.

Revealing—means to restore an obscured network communication to its expected form.

Communication Channel, Path or Line and a Network Channel, Path, or Line—refer either to a physical transmission medium such as a wire, or to a logical connection over a multiplexed medium such as a radio channel for the purpose of conducting electronic communications between two or more devices in the computer network in either digital or analog formats.

Idempotent—in mathematics and computer science, is the property of certain operations that can be applied multiple times without changing the result beyond the initial application.

Environment:

Using FIG. 1A, a diagram of an example Digital Communications Local Area Network and External Network (Network), or Network 1, in which the present invention may be implemented and Network 1 includes computers 12 and 14 and each computer 12 and 14 includes a network interface device 16 or 18. Network 1 also includes modem/router link 20 (link 20). Communication Paths, or Communications Lines, or wire, 22 and 24 that connect network interface devices 16 and 18 to modem link 20 which is connected to external network 26, or Network 2, by communication path 28. Computers 12 and 14 can each be referred to as a node or a module or a generator meaning they are an active electronic device attached to network 1, and are capable of creating, receiving, or transmitting information over a communications channel on network 1. Link 20 can also be referred to as a node on network 1.

Computers 12 and 14 represent generally any devices capable of transmitting and receiving electronic data. While shown as desktop and laptop computers, devices 12 and 14 could, for example, be personal digital assistants or credit card machines, etc. Network interface devices 16 and 18 represent generally any combination of hardware and/or programming capable of transmitting and receiving network communications. Link 20 represents generally any combination of hardware and/or programming capable of receiving network communication from computers 12 and 14 and from external network 26 and routing the communication to its intended destination. Where the communication is between computers 12 and 14, link 20 functions as a hub. Where communication is between computer 12 or 14 and external network 26, link 20 functions as a router. The connections between link 20 and paths 22 and 24 are referred to as internal ports, and the connection between link 20 and path 28 to external network 26 is referred to as an external port.

Communication paths 22, 24, and 28 represent generally any physical medium for transmitting network communications. A path may be physical wires, optical cables or any other physical media through which data may be transmitted. One path 22, 24, or 28 may use one medium, while another path may use a different medium. For example, path 24 may use a telephone line, path 22 may use cat-S cable and path 28 might be a fiber optical cable.

Figure 1B:
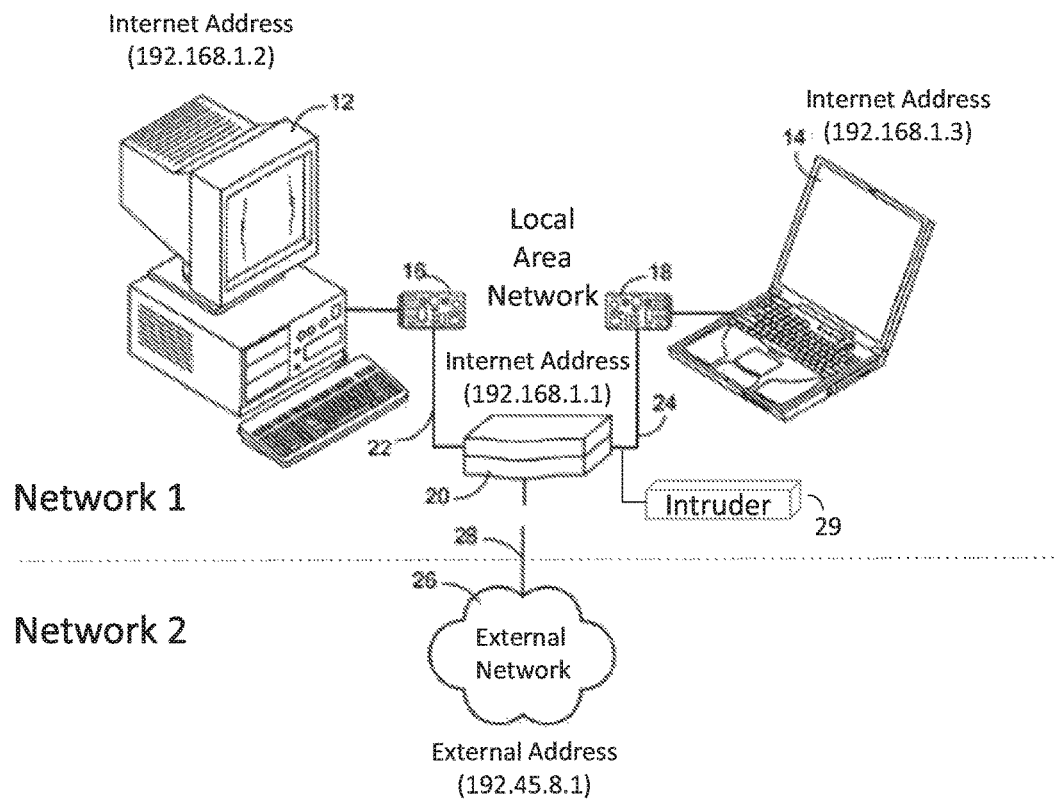
FIG. 1B is a schematic diagram of a typical computer network in which an Intruder device has been inserted.

Using FIG. 1B, a diagram of Network 1, an Intruder device 29 has been attached to the network on cable 24 between Link 20 and the network interface device 18 of laptop computer 14. In our example we are assuming that Link 20 includes a multi-drop topography architecture, and in FIG. 2A it can be shown that the Intruder device has access to the entire network managed by Link 20. Inserted in this manner, the Intruder device would be able to observe all network traffic. Depending on the nature of the Intruder device, it could also perform destructive functions like injecting spurious network data traffic, generating false electrical signals, capturing transmitted data and a host of other destructive measures.

Network Communications and Data Streams:

Using FIG. 1A, computers 12 and 14 and link 20 form a local area network. Each has its own internal address while link 20 also has an external address for communicating with external network 26. If, for example, computer 12 wants to send data to computer 14, computer 12 places the data into a packet. For identification and communication purposes computer 12 puts its own address (e.g. 192.168.1.2) into the packet. The packet also includes the destination address (e.g. 192.168.1.3) for computer 14. Computer 12 can determine that computer 14 is on the same local area network, so it sends the packet over path 22 to link 20. Link 20 then rebroadcasts the packet through each of its internal ports. Computers 12 and 14 each receive the packet and read the packet's destination address. Recognizing that it is not the intended destination, computer 12 ignores the packet. Computer 14, on the other hand, recognizes that it is the intended recipient of the packet and accepts it. It is noted that multiple packets are usually required to transmit data between computers 12 and 14.

If, for example, computer 12 wants to send data to external network 26, computer 12 places the data into a packet. The packet includes the source address (e.g. 192.168.1.2) and the destination address (e.g. 192.45.8.1). Computer 12 can determine that the destination address is not on the same local area network, so computer 12 includes an intermediate address in the packet, the internal address for link 20, and sends the packet to link 20. Link 20 then rebroadcasts the packet through its external port to external network 26.

When link 20 receives a packet addressed to computer 12 from external network 26, link 20 rebroadcasts the packet through each of its internal ports. Computers 12 and 14 each receive the packet and read the packet's destination address. Recognizing that it is not the intended destination, computer 14 ignores the packet. Computer 12, on the other hand, recognizes that it is the intended recipient of the packet and reads it.

Operation:

In operation, link 20 continually and simultaneously broadcasts the same data stream through each of its internal ports. Computers 12 and 14 continually monitor the data stream ignoring some packets and reading others. The data stream broadcast by link 20 and monitored by computers 12 and 14 is generated as a result of various human interactions with computers 12 and 14 and external network 26. Given a sufficiently large number of human interactions contributing to the data stream, that stream is for all intents and purposes truly random and unpredictable. When broadcast by link 20, the data stream is instantaneously received by computers 12 and 14. Link 20 and computers 12 and 14 can simultaneously sample and process the data stream at each end of communication paths 22 and 24 allowing each to generate identical cryptographic keys.

In the example of FIG. 1A, network communications includes all the communications broadcast and received at each end of each communication path 22 and 24. By contrast, the term data stream means data broadcast from a source over one communication path or simultaneously over multiple communication paths. In the example of FIG. 1A, the term data stream includes the stream of data broadcast by link 20 through each of its internal ports over communication paths 22 and 24. A data stream is then an example of a network communication. Because network communications can come from multiple sources, not all network communications are data streams.

Figure 2A:
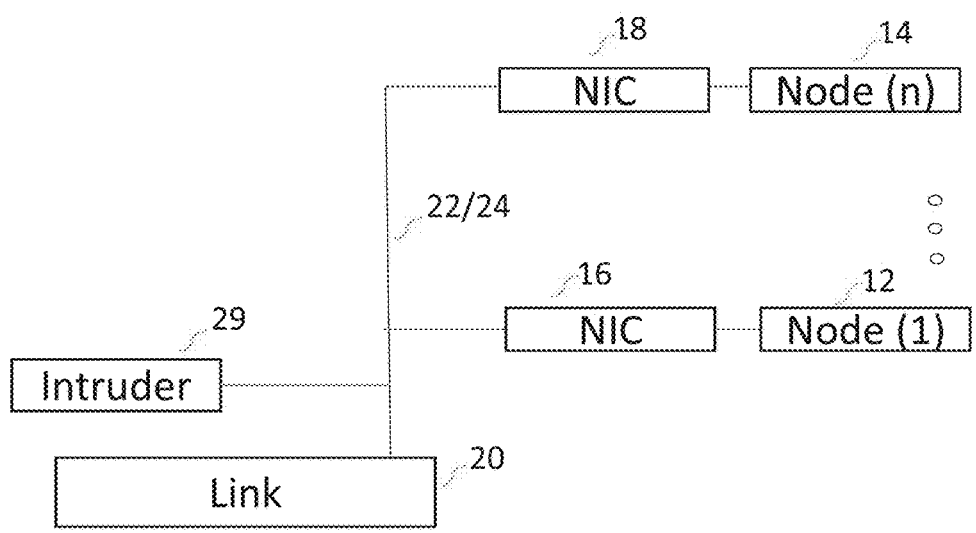
FIG. 2A is a logical schematic diagram of a typical computer network in which an Intruder device has been inserted.

As shown in FIG. 1B and FIG. 2A, with the insertion of Intruder 29 into the network, all of the above can be observed, captured and/or disrupted by Intruder 29.

Fundamental Quantities

An electric circuit is formed by interconnecting components having different electric properties. Therefore, in the analysis of electric circuits, it is important to know the properties of the involved components as well as the way the components are connected to form the circuit.

In the study of electric circuits, we deal with the fundamental phenomenon of the movement of electrically charged particles (charged particles). The fundamental quantities that are used to describe how rapidly charged particles move in a circuit and in what way they do so in the circuit are current (I) and voltage (V). Current is often referred to as the "through" quantity and voltage as the "across" quantity.

In the physical context, current is the flow of electric charge through a component or apparatus and it flows from high potential to low potential and is defined as the amount of charge passing through that component or apparatus per unit of time. Voltage is defined as the potential difference between two points in a circuit.

Electrical current is measured by the rate of electric charge flow in an electrical circuit:

$$i(t)=dQ(t)/dt$$

The momentary current is given by the derivative of the electric charge by time.
i(t) is the momentary current I at time t in amps (A).
Q(t) is the momentary electric charge in coulombs (C).
t is the time in seconds (s).
When the current is constant:

$$I=\Delta Q/\Delta t$$

I is the current in amps (A).
ΔQ is the electric charge in coulombs (C), that flows at time duration of Δt.
Δt is the time duration in seconds (s).
Current calculation with Ohm's law:
The current $I_R$ in amps (A) is equal to the resistor's voltage $V_R$ in volts (V) divided by the resistance R in ohms (Ω):

$$I_R=V_R/R$$

Similarly, in the physical context, voltage is defined as the potential difference between two points in a circuit and is calculated with Ohm's law:
The voltage $V_R$ is equal to the current $I_R$ in amps (A) times the resistance R in ohms (Ω):

$$V_R=I_R\cdot R$$

This leads us to Kirchhoff's Current Law (KCL). Using the above as a foundation, Kirchhoff's current law, also called Kirchhoff's first law, Kirchhoff's point rule, or Kirchhoff's junction rule (or nodal rule) deals with the principle of conservation of electric charge and implies that:

At any node (junction) in an electrical circuit, the sum of currents flowing into that node is equal to the sum of currents flowing out of that node or equivalently, the algebraic sum of currents in a network of conductors meeting at a point is zero.

Recalling that current is a signed (positive or negative) quantity reflecting direction towards or away from a node, this principle can be stated as:

$$\sum_k I_k = 0$$

k is the total number of branches with currents flowing towards or away from the node.
Note: This formula is valid for complex currents.

The law is based on the conservation of charge whereby the charge (measured in coulombs) is the product of the current (in amperes) and the time (in seconds).

Similarly to KCL, Kirchhoff's second law states that the directed sum of the electrical potential differences (voltage) around any closed network is zero. More simply, the sum of the emfs in any closed loop is equivalent to the sum of the potential drops in that loop, or, the algebraic sum of the products of the resistances of the conductors and the currents in them in a closed loop is equal to the total emf available in that loop. It can be stated as:

$$\sum_k V_k = 0$$

Here, k is the total number of voltages measured.
Note: The voltages may also be complex.

This law is based on the conservation of energy whereby voltage is defined as the energy per unit charge. The total amount of energy gained per unit charge must be equal to the amount of energy lost per unit charge, as energy and charge are both conserved.

Taking this one step further, Thévenin's theorem, as proven by Dr. M. E. Van Valkenburg, states that any device containing resistances only and voltage and current sources can be replaced by a Thévenin equivalent circuit consisting of an equivalent voltage source $V_{Th}$ in series connection with an equivalent resistance $R_{Th}$.

The Thévenin-equivalent voltage $V_{Th}$ is the voltage at the output terminals of the original circuit. When calculating a Thévenin-equivalent voltage, the voltage divider principle is often useful, by declaring one terminal to be $V_{out}$ and the other terminal to be at the ground point.

The Thévenin-equivalent resistance $R_{Th}$ is the resistance measured across selected points, A and B, "looking back" into the circuit. It is important to first replace all voltage and current sources with their internal resistances. For an ideal voltage source, this means replace the voltage source with a short circuit. Resistance can then be calculated across the terminals using the formulae for series and parallel circuits. This method is valid only for circuits with independent sources. If there are dependent sources in the circuit, another method must be used such as connecting a test source across A and B and calculating the voltage across or current through the test source.

Note: The replacement of voltage and current sources do the opposite of what the sources themselves are meant to do. A voltage source creates a difference of electric potential between its terminals; its replacement in Thévenin's theorem resistance calculations, a short circuit, equalizes potential. Likewise, a current source's aim is to generate a certain amount of current, whereas an open circuit stops electric flow altogether.

In circuit theory terms, the theorem allows any one-port network to be reduced to a single voltage source and a single impedance.

The theorem also applies to frequency domain AC circuits consisting of reactive and resistive impedances.

Thévenin's theorem and its dual, Norton's theorem ($R_{Th}=R_{No}$, $V_{Th}=I_{No}R_{No}$, $I_{No}=V_{Th}/R_{Th}$), are widely used to make circuit analysis simpler and to study a circuit's initial-condition and steady-state response. Thévenin's theorem can be used to convert any circuit's sources and impedances to a Thévenin equivalent. Use of the theorem may in some cases be more convenient than use of Kirchhoff's circuit laws.

The same concept can be used for capacitance (C) and inductance (L), sometimes expresses as complex impedences in the Thévenin domain.

Detecting and Reporting:

This section describes various components and techniques for observing, detecting, taking action and reporting on electronic Intruders 29.

When an Intruder attaches to a local area network (LAN), as shown in FIGS. 1B and 2A, it is imperative that their presence be known to the owner of that LAN. Once the Intruder's presence is known, it becomes important to know where in the LAN the Intruder is attached. Once both have been established, the owner of the LAN can take proper action to contain, manage and/or remove the Intruder from the LAN.

Figure 4:
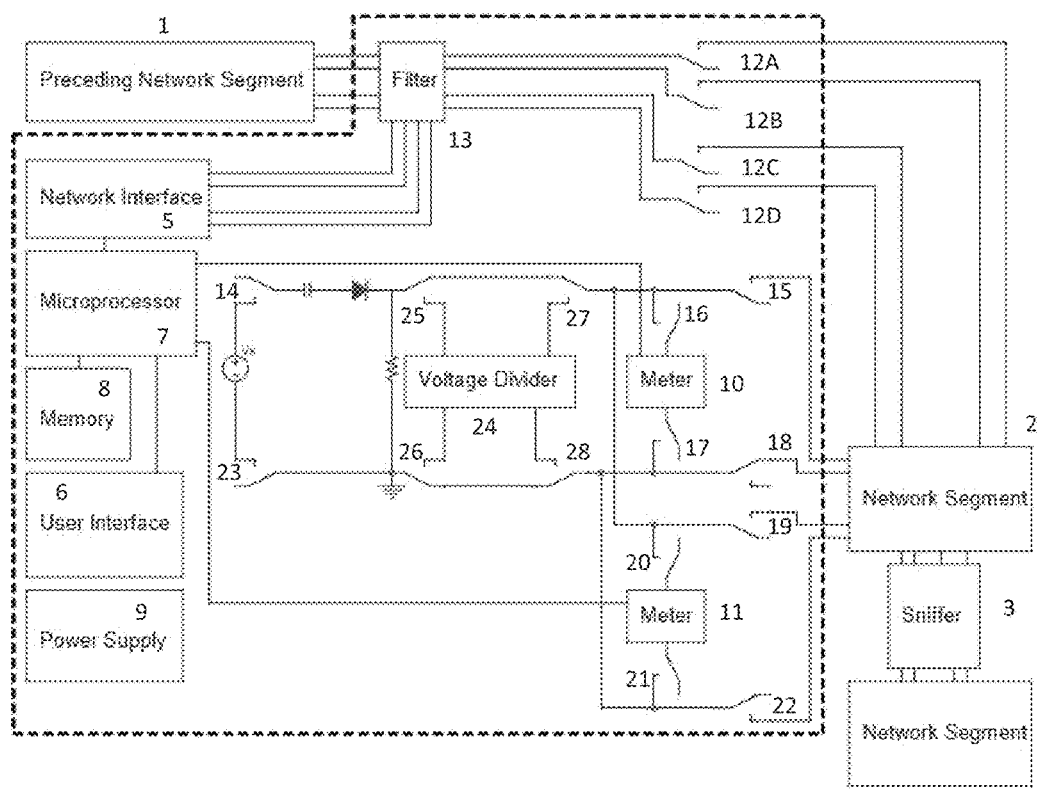
FIG. 4 is a schematic diagram of the first embodiment of the invention deployed as a Controller device.

The present invention, when included with other commonly available electronic components to form a Controller, FIG. 4, the present invention is capable of determining the presence of an Intruder on a LAN, determining where in the LAN the Intruder is attached and taking action against the Intruder, up to and including electronic neutralization of the Intruder.

In order to do this, we must have a sure way to calculate any of the values in a reactive DC circuit over time. The first step is to identify the starting and final values for whatever quantity the capacitor or inductor opposes change in (i.e. whatever quantity the reactive component is trying to hold constant). For capacitors, this quantity is voltage and for inductors, this quantity is current. When the switch in a circuit is closed (or opened), the reactive component will attempt to maintain that quantity at the same level as it was before the switch transition, so that value is to be used for the "starting" value. The final value for this quantity is whatever that quantity will be after an infinite amount of time. This can be determined by analyzing a capacitive circuit as though the capacitor was an open-circuit, and an inductive circuit as though the inductor was a short-circuit, because that is what these components behave as when they've reached "full charge," after an infinite amount of time.

Next, the time constant of the circuit must be calculated—the amount of time it takes for voltage or current values to change approximately 63 percent from their starting values to their final values in a transient situation. In a series RC circuit, the time constant is equal to the total resistance in ohms multiplied by the total capacitance in farads. For a series L/R circuit, it is the total inductance in henrys divided by the total resistance in ohms. In either case, the time constant is expressed in units of seconds and symbolized by the Greek letter "tau" ($\tau$):

For resistor-capacitor circuits:

$$\tau=RC$$

For resistor-inductor circuits:

$$\tau=L/R$$

The rise and fall of circuit values such as voltage and current in response to a transient is asymptotic. Being so, the values begin to rapidly change soon after the transient and settles down over time. If plotted on a graph, the approach to the final values of voltage and current form exponential curves.

Note: A similar $\tau$ exists for RLC.

One time constant is the amount of time it takes for any of these values to change about 63 percent from their starting values to their (ultimate) final values. For every time constant, these values move (approximately) 63 percent closer to their eventual goal. The mathematical formula for determining the precise percentage is:

$$\text{Percentage of Change}=(1-1/e^{t/\tau})\times 100\%$$

Where: The letter e stands for Euler's constant, which is approximately 2.7182818.

It is derived from calculus techniques, after mathematically analyzing the asymptotic approach of the circuit values. After one time constant's worth of time, the percentage of change from starting value to final value is:

$$(1-1/e^1)\times 100\%=63.212\%$$

After two time constant's worth of time, the percentage of change from starting value to final value is:

$$(1-1/e^2)\times 100\%=86.466\%$$

After ten time constant's worth of time, the percentage is:

$$(1-1/e^{10})\times 100\%=99.995\%$$

The more time that passes since the transient application of voltage, the larger the value of the denominator in the fraction, which makes for a smaller value for the whole fraction, which makes for a grand total (1 minus the fraction) approaching 1, or 100 percent.

A more universal formula can be made out of this for the determination of voltage and current values in transient circuits, by multiplying this quantity by the difference between the final and starting circuit values:

$$\text{Change}=(\text{Final}-\text{Start})(1-1/e^{t/\tau})$$

Where:

Final=Value of calculated variable after infinite time (its ultimate value)

Start=Initial value of calculated variable e=Euler's number ($\approx$2.7182818)

t=Time in seconds $\tau$=Time constant for circuit in seconds

Since we know that when plotted on a graph, the approach to the final values of voltage and current form exponential curves, we can combine this approach with the Kirchhoff, Thevenin and Norton theorems to form the foundation on which the present invention as implemented in a Controller device, FIG. 4, can accomplish the tasks of Intruder detection, isolation to a LAN segment and possible Intruder neutralization.

Figure 2B:
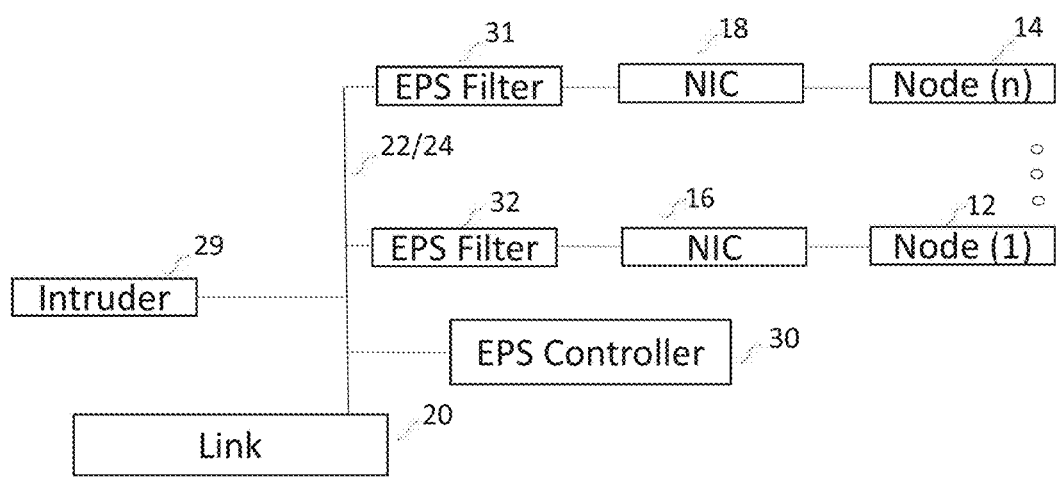
FIG. 2B is a block diagram illustrating the relationship of an Intruder to the components and exemplary state modules according to a first embodiment of the invention.

For illustrative purposes, a scenario of monitoring network communications and then securing it is used. Several figures will be used to illustrate LAN communications monitoring and securing:

FIG. 2B represents the Controller 30 configured into the LAN as shown.

Figure 3A:
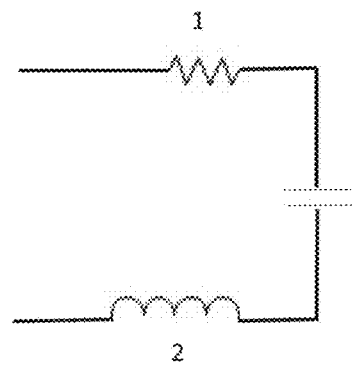
FIG. 3A is an electronic circuit diagram illustrating an example voltage "sniffer" utilized by a network Intruder.

FIG. 3A represents the Intruder 29 shown in FIG. 1B and FIG. 2A.

Figure 3B:
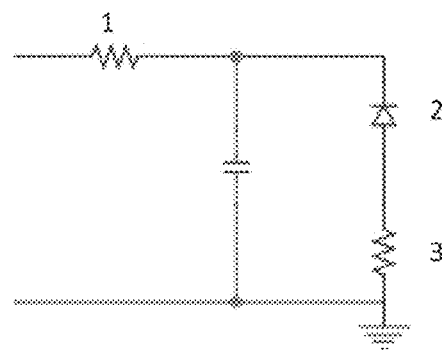
FIG. 3B is an electronic circuit diagram illustrating an example passive voltage filter utilized by a first embodiment of the invention to protect user designated devices on a typical computer network.

FIG. 3B represents the EPS Filter 31 and 32 shown in FIG. 2B.

FIG. 4 represents the embodiment of the present invention with other commonly available electronic components to form a Controller.

All LAN's have a characteristic electronic signature referred to as $\tau$. That signature forms the basis for analysis and decision making regarding action to be taken in the event an Intruder is detected. In order to capture that signature a Controller, FIG. 4, must be installed on the LAN, or LAN segment, as shown in FIG. 2B, item 30, and a test must be run on that LAN which captures it's characteristic electronic signature.

In order to run that test, certain components are necessary, including a Controller, FIG. 4, and filters, FIG. 3B. The Controller must be installed on the LAN, FIG. 2B item 30, in such a manner as to allow it to monitor the entire network as a Master Controller or on a LAN segment as a Controller to monitor that segment. Filters must be installed on each device attached to the LAN as shown in FIG. 2B, items 31 and 32. An alternative to using a filter would be to simply turn off any LAN attached device prior to running the sampling test and then turning it on after the test.

Figure 6:
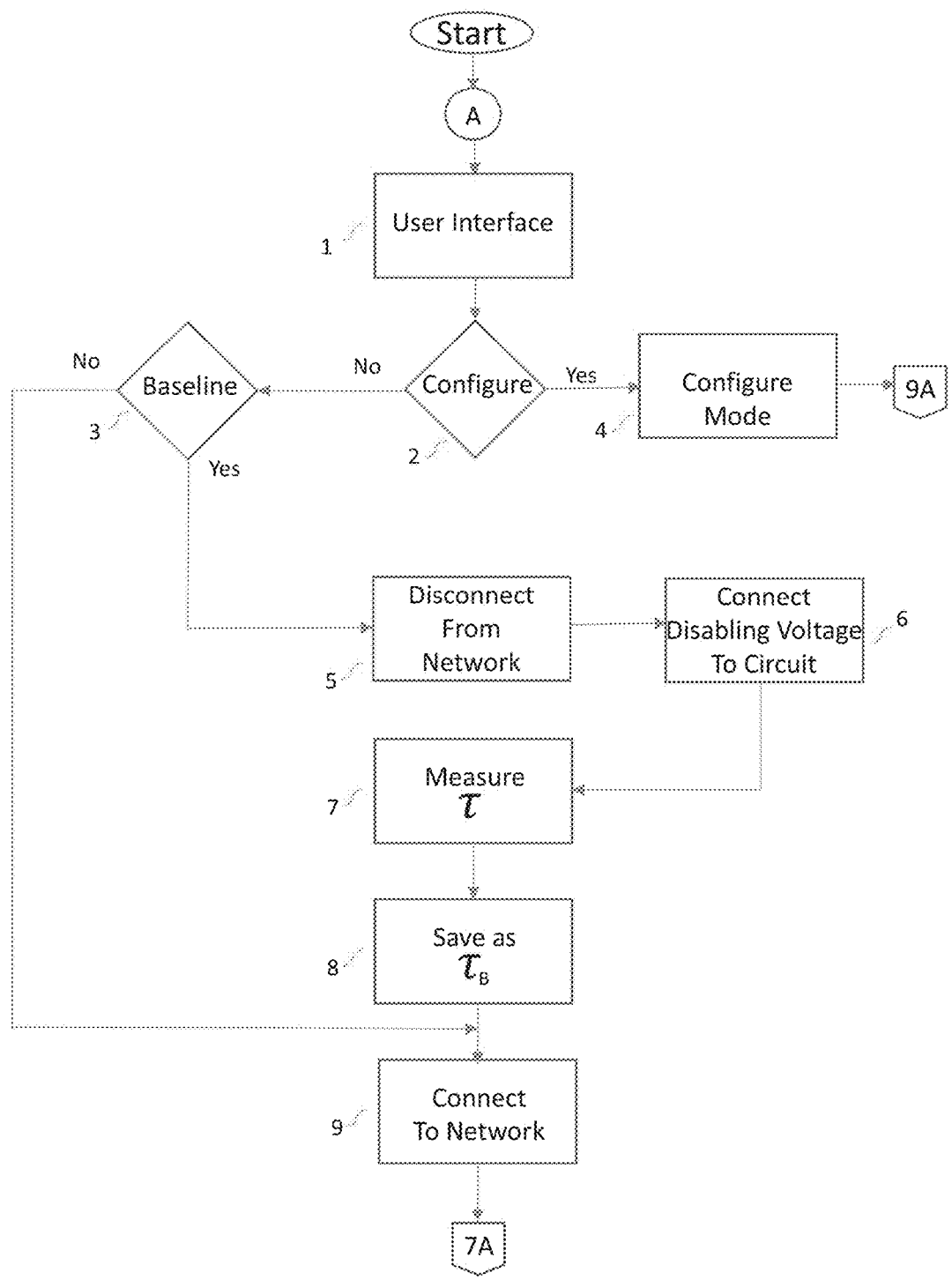
FIG. 6 is a block diagram illustrating the process utilized by a first embodiment of the invention to develop a baseline electronic signature of a computer network or computer network segment it is protecting.
Figure 9:
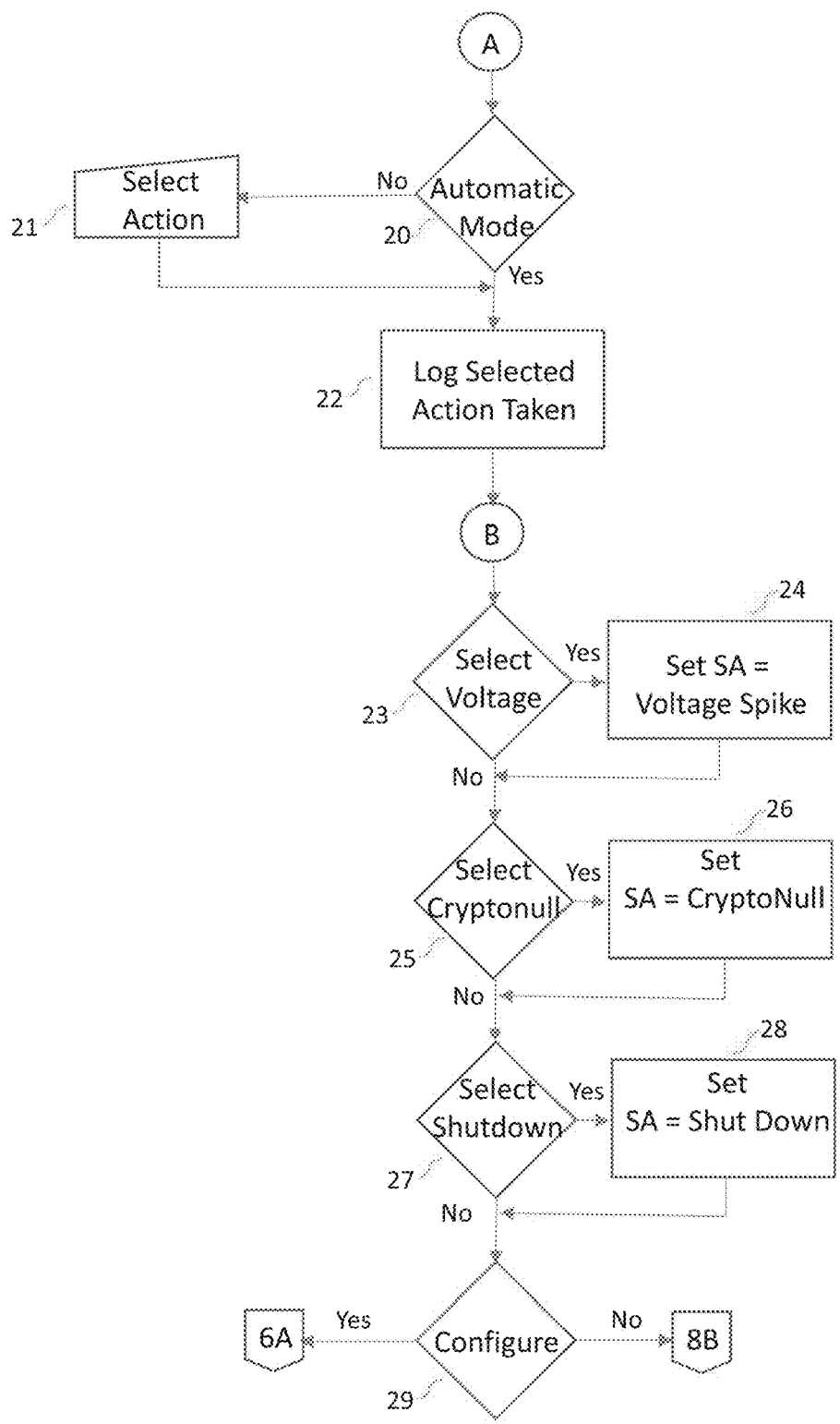
FIG. 9 is a block diagram illustrating the process utilized by a first embodiment of the invention to process sampled computer network electronic signatures and decide appropriate action(s) to be taken.

The Controller operates in several modes, depending on requirements:

Configuration Mode—used to establish Controller Options, FIG. 6 and FIG. 9.

Baseline Mode—used to establish network characteristics, FIG. 6.

Figure 7:
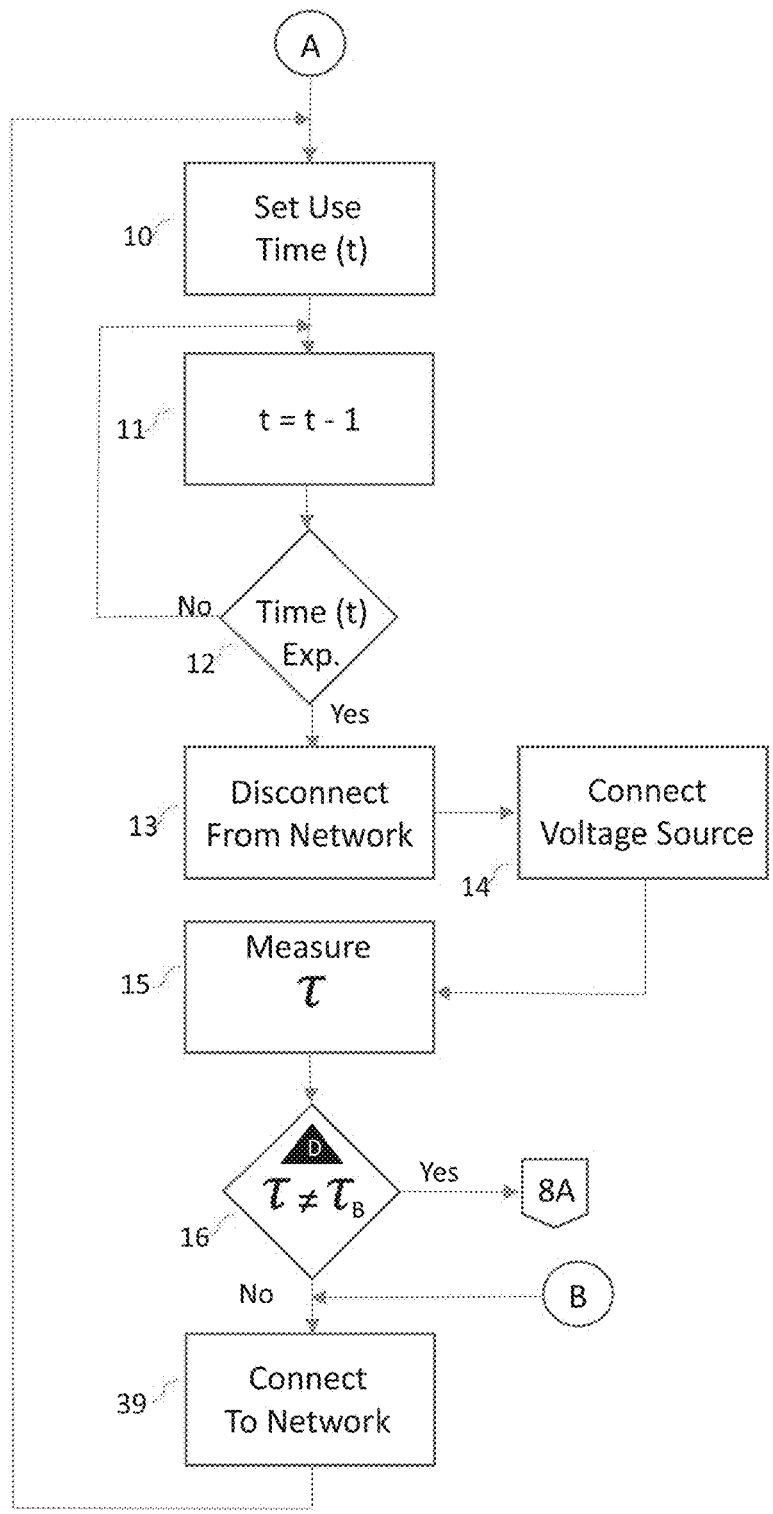
FIG. 7 is a block diagram illustrating the process utilized by a first embodiment of the invention to process and sample computer network electronic signatures over time.

Normal Mode—used for detecting Intruders, FIG. 7.

Figure 8:
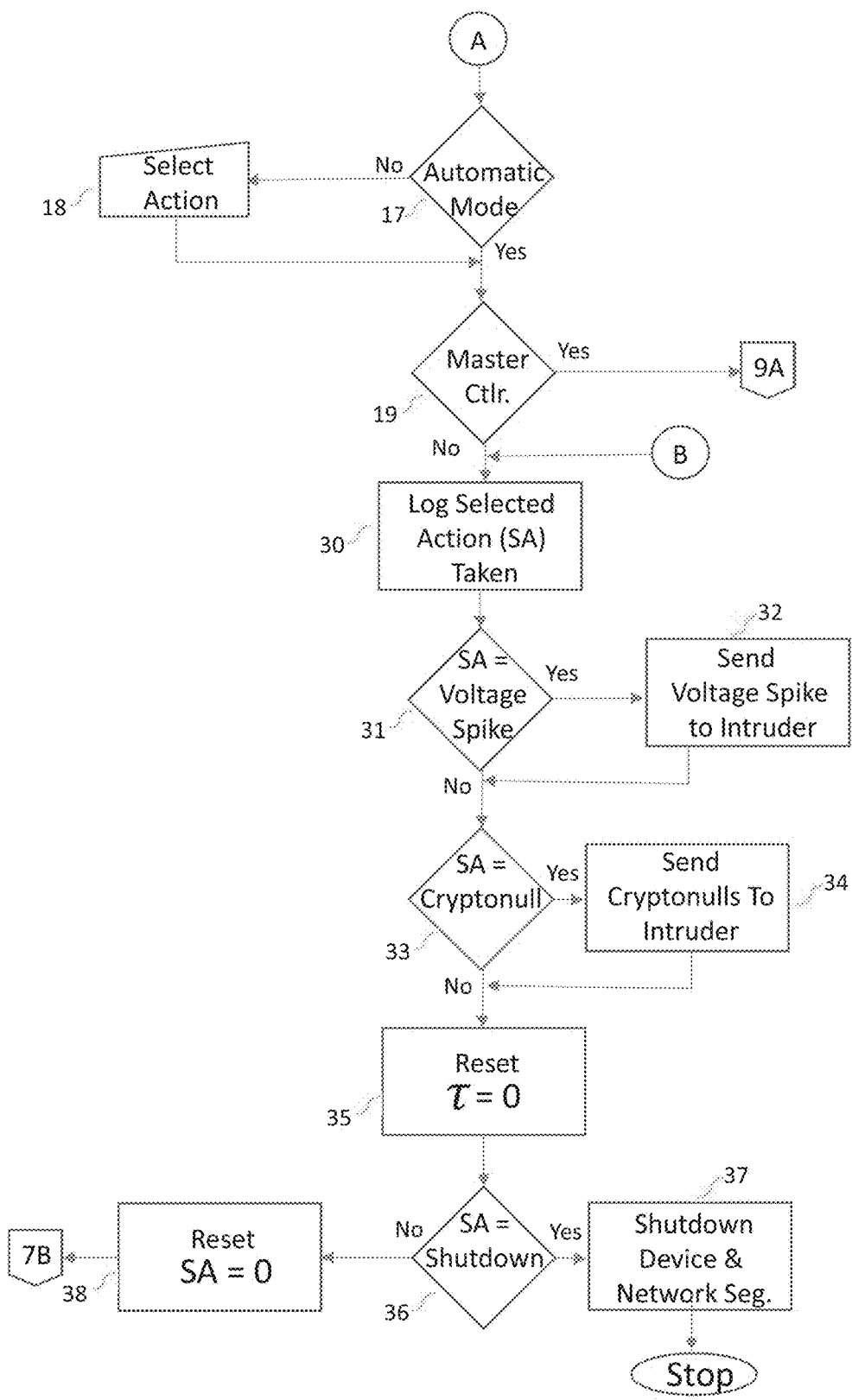
FIG. 8 is a block diagram illustrating the process utilized by a first embodiment of the invention to process stored network signatures and take user designated action(s).

Protection Mode—used to take action against a detected Intruder, FIG. 8 and FIG. 9.

Isolation Mode—used to isolate a LAN segment.

Configuration Mode is used to establish configuration options for the device itself. Using FIG. 6 and FIG. 9 as guides to the process:

The Controller, FIG. 4, is running in Normal mode on the LAN and the switches shown are set to accommodate that mode.

Using the Microprocessor and User Interface, FIG. 4 items 6 and 7, the Controller communicates with the End-User who specifies that the controller be set to Configuration Mode.

Using FIG. 6 item 4, the Controller establishes that it is in Configuration Mode and using FIG. 9, starting at item 20 the Controller is set to be in either manual interface with the LAN administrator or automatic for the action to take in the event an Intruder is detected:

Neutralize the Intruder with a voltage surge.

Send crypto-nulls to the Intruder.

Shut down the network segment where the Intruder was located.

Take no action.

The Controller returns to the User Interface, FIG. 6, item 1.

Baseline Mode is used to establish network characteristics. Using FIG. 6 as a guide to the process:

The Controller, FIG. 4, is running in Normal mode on the LAN and, ensures that all switches shown are set to accommodate that mode.

Using the User Interface, item 1, the End-User specifies that a LAN baseline characteristic electronic signature be established and, the switches are set to accommodate.

The Controller sends a set amount of baseline voltage throughout the LAN.

Then, over a random time period it uses the Meters, FIG. 4 items 10 and 11, to sample the LAN and then calculates $\tau_B$ for that interval.

The Controller stores into Memory, FIG. 4 item 8, for each time interval the calculated, $\tau_B$, the duration of the random time period and the interval number.

The Controller reactivates all monitoring circuitry and the Controller reconnects itself to the LAN and returns to Normal operating mode and the switches shown in FIG. 4 are set to accommodate Normal operating mode.

Any device that was disconnected in lieu of using a filter is reconnected to the LAN by the End-User.

The Controller resets itself to Normal operating mode.

If an Intruder is present during the establishment of the baseline, any electronic signature it might have is disqualified by virtue of the baseline voltage sent through the network.

Once the baseline network electronic characteristics have been established, the Controller will function in Normal Mode in order to detect the presence of an Intruder. While in Normal Mode, using FIG. 7 as a guide:

The Controller ensures the switches shown in FIG. 4 are set to accommodate Normal operating mode.

The Controller sets an internal timer to determine the next interval when upon expiration, the Controller will sample the LAN to develop a then current value for $\tau$.

On a predetermined schedule, the Controller, decrements the internal timer.

The Controller checks the internal timer to determine if it has expired.

If the internal timer has not expired, the Controller continues its process of decrementing the internal timer and checking it to see if it has expired.

If the internal timer has expired, the Controller connects the voltage source and disconnects from the LAN and the switches shown in FIG. 4 are set to accommodate that mode.

Then, over the same time period used to determine $\tau_B$, the Controller samples the LAN by reading the Meters, FIG. 4 items 10 and 11, and then calculates $\tau$.

The Controller applies Kirchoff's theorem, Thevenin's equivalent theorem and Norton's theorem, combined with the fact that the rise and fall of circuit values such as voltage and current in response to a transient is asymptotic and the values begin to rapidly change soon after the transient and settles down over time, to develop a graph that forms exponential curves of voltage and current.

The same is done using $\tau_B$ that was previously stored in Memory, FIG. 4 item 8.

The graphs of $\tau$ and $\tau_B$ are compared, $\tau_B-\tau=\tau_?$, and if $\tau_?$ is the same or within End-User defined acceptable variance the Controller repeats these steps, inclusive.

The graphs of $\tau$ and $\tau_B$ are compared, $\tau_B-\tau=\tau_?$, and if $\tau_?$ is the same or within End-User defined acceptable variance the Controller will switch to Protection mode, FIG. 8.

Once all $\tau_?$ calculations and comparisons for all time intervals has been completed and no significant variances found, the Controller connects to the LAN and the switches shown in FIG. 4 are set to accommodate a Normal Operating mode.

Once an Intruder has been detected, the Controller will function in Protection Mode. While in Protection Mode, using FIG. 8 as a guide:

The Controller ensures the switches shown in FIG. 4 are set to accommodate a Normal Operating mode.

Using the Microprocessor, FIG. 4 item 7 the Controller will first determine if it has been set to Manual mode for taking action and if so it will notify the End-User via the User Interface, FIG. 4 item 6 and obtain instructions and set a temporary Selected Action indicator as to whether or not it should neutralize the Intruder, send crypto-nulls to the Intruder, shutdown the LAN segment it manages or do nothing.

Using the Microprocessor, FIG. 4 item 7 the Controller will first determine if it has been set to Automatic mode for taking action and if so it will obtain instructions from its Memory, FIG. 4 item 8, and set a temporary Selected Action as to whether or not it should neutralize the Intruder, send crypto-nulls to the Intruder, shutdown the LAN segment it manages or do nothing.

Using the Microprocessor, FIG. 4 item 7 the Controller will then determine if it has been set to be instructed by the Master Controller, if present, or to continue with its own local Memory, FIG. 4 item 8, stored instructions as to how to deal with the Intruder.

If a Master Controller is present, the Controller will communicate with the Master Controller to request that instructions be provided to neutralize the Intruder, send crypto-nulls to the Intruder, shutdown the LAN segment it manages or do nothing. The Master Controller will set a temporary Select Action (SA) indicator and communicate with the requesting Controller whether it should neutralize the Intruder, send crypto-nulls to the Intruder, shutdown the LAN segment it manages or do nothing.

The Controller will set the final Selection Action (SA) indicator for its use.

If the final SA indicator value designates that the Intruder be neutralized, the Controller will neutralize the Intruder.

If the final SA indicator value designates that crypto-nulls be sent to the Intruder, the Controller will send crypto-nulls to the Intruder.

If the final SA indicator value designates that the LAN segment be shut down, the Controller will shut down the LAN segment.

If the final SA indicator value designates that nothing be done to the Intruder, the Controller will do nothing to the Intruder.

The Controller will reset its final SA indicator and reset its' switches, FIG. 4, to accommodate a Normal Operating mode.

The Controller will return to Normal Operations, FIG. 7 item 9.

While in Isolation Mode, using FIG. 8 item 37 as a guide:

The Controller will disable the network segment between itself and the next downstream Controller on that particular network segment, thus, isolating the network between itself and the next Controller.

Using the Microprocessor, FIG. 4 item 7 the Controller will first determine if it has been set to Manual mode for taking action and if so it will notify the End-User via the User Interface, FIG. 4 item 6 and obtain instructions and set a temporary Selected Action indicator as to whether or not it should shut down the LAN segment it manages or do nothing.

Using the Microprocessor, FIG. 4 item 7 the Controller will first determine if it has been set to Automatic mode for taking action and if so it will obtain instructions from its Memory, FIG. 4 item 8, and set a temporary Selected Action as to whether or not it should shut down the LAN segment it manages or do nothing.

If a Master Controller is present, the Controller will communicate with the Master Controller to request that instructions be provided to reset itself to neutralize the Intruder, send crypto-nulls to the Intruder, shutdown the LAN segment it manages or do nothing. The Master Controller will set a temporary Select Action indicator and communicate with the requesting Controller whether it should neutralize the Intruder, send crypto-nulls to the Intruder, shut down the LAN segment it manages or do nothing.

The Controller, FIG. 4, on a pre-determined schedule, will repeat these steps until it reaches the time limit set by the End-User or it is manually instructed by the End-User to resume Normal Mode operations.

Figure 5A:
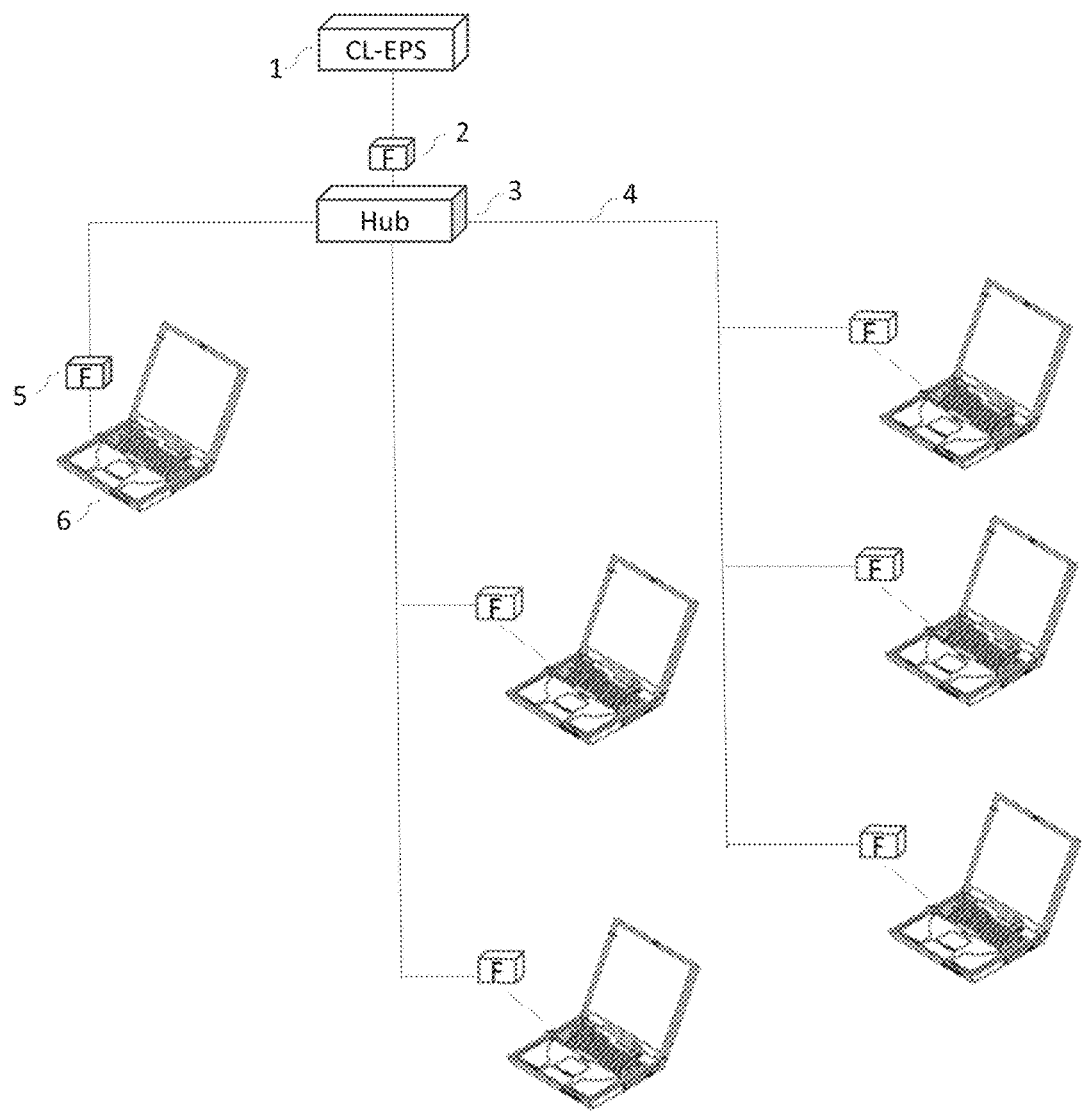
FIG. 5A is a schematic diagram of how the first embodiment of the invention can be deployed in a typical local area network.

When deployed in a typical user environment, the CL-EPS Controller can be configured for use in a variety of roles. In the simple case, FIG. 5A, a single CL-EPS Controller, item 1, can be used to monitor an entire LAN. However, when in this configuration, the ability to isolate and locate the whereabouts of an Intruder is not applicable.

Figure 5B:
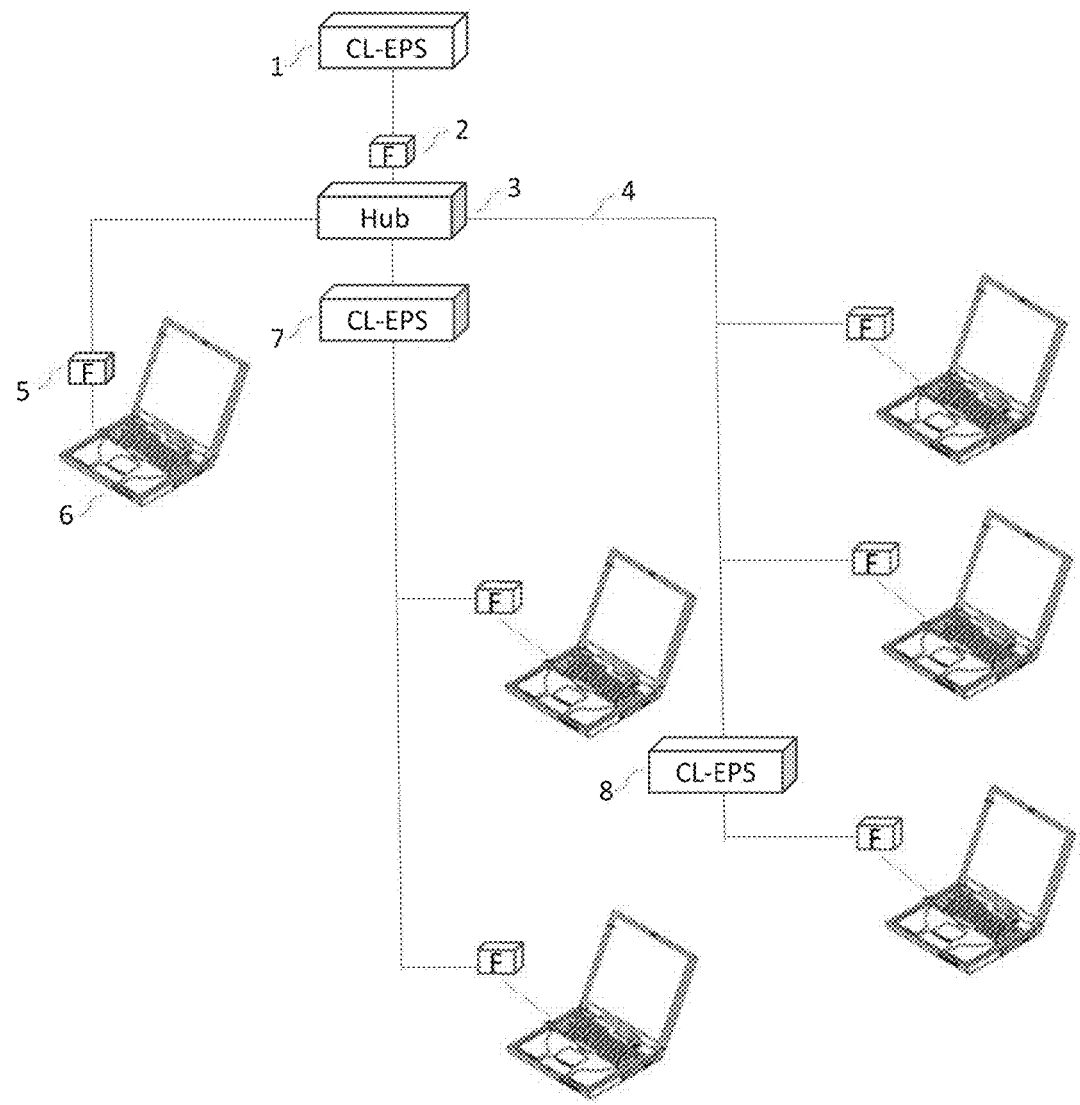
FIG. 5B is a schematic diagram of how the first embodiment of the invention can be deployed in a typical local area network with a Master Controller scenario.

Using a different configuration, such as FIG. 5B, would offer the ability to isolate and locate the whereabouts of an intruder wherein all CL-EPS Controllers respond to the central command(s) of the Master Controller for Intruder processing.

Figure 5C:
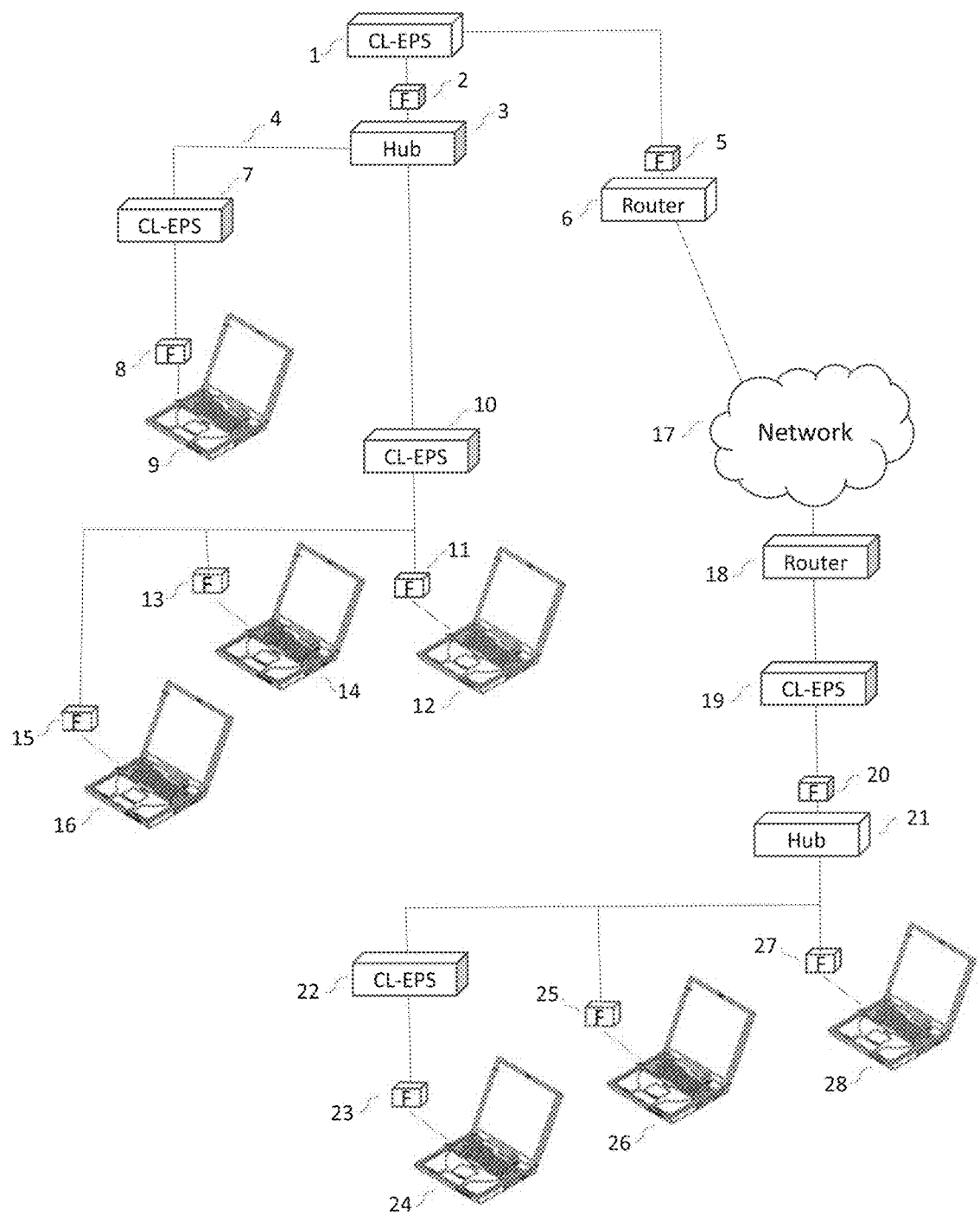
FIG. 5C is a schematic diagram of how the first embodiment of the invention can be deployed in a typical local area network and wide area network with a Master Controller scenario.

And, yet another possibility, such as FIG. 5C, would offer CL-EPS Controller protection for an entire corporate infrastructure.

Conclusion:

Not being able to detect the presence of an intruder on a Local Area Network creates the necessary environment for the ultimate "man-in-the-middle" attack. Until recently, this has not been considered critical because of the use of modern cipher technology. It has been assumed that because of their large key spaces, modern ciphers like AES are, statistically speaking, not able to be broken. But, that has been proven not to be the case and modern hardware, software and intrusion techniques and technology have made it possible for hackers to attach intruder devices to a Local Area Network, thus, giving them access to everything taking place on that network.

Having the capability to detect such intruders tells us an attack is either underway, or will shortly be underway. Just knowing this is of great value and importance and allows network administrators and management to actually be proactive, instead of reactive, in order to ensure network/LAN privacy.

Through the mathematically provable and unique application of Kirchoff's theorem, Thevenin's equivalent theorem and Norton's theorem, combined with the fact that the rise and fall of circuit values such as voltage and current in response to a transient is asymptotic and the values begin to rapidly change soon after the transient and settles down over time, a LAN intruder can be detected. When combined with the additional capabilities of Intruder neutralization, isolation, spoofing with cryptonulls and simply knowing of their presence they can be effectively controlled and their presence becomes less of an issue and their presence can actually be used against them.

The invention claimed is:

1. A secure electronic local area network comprising:
 a local area network asset connected to an external network;
 means connected to said local area network asset to detect the presence of extraneous electronic circuitry placed onto the physical wiring which were not originally designed as part of the electronic circuitry of that local area network, said extraneous electronic circuitry originating from said external network;
 means connected to said local area network to report said presence of extraneous electronic circuitry; and
 means to take action against said extraneous electronic circuitry, wherein said means to take action further comprises:

means to detect intruder(s) presence through the application of Kirchoff's theorem, Thevenin's equivalent theorem and Norton's theorem, combined with the fact that the rise and fall of the characteristic time constant, $\tau$, as measured by using circuit values including voltage and current, in response to a transient that is asymptotic and the values begin to rapidly change soon after the transient is applied and settles down overtime, wherein the value $\tau$ is reflective of the network signature, including the attached nodes at any time.

2. The secure electronic local area network according to claim 1 wherein said means to take action comprises means to send crypto-nulls to said extraneous circuitry.

3. The secure electronic local area network according to claim 1 wherein said means to take action comprises means to disconnect or shut down the local area network.

4. The secure electronic local area network according to claim 3 wherein there are multiple local area network assets connected together, all of said local area local area network assets being connected to an external network and wherein said means connected to said local area network asset to detect the presence of extraneous electronic circuitry placed onto the physical wiring which were not originally designed as part of the electronic circuitry of that local area network detects which asset has extraneous electronic circuitry connected thereto, and said means to take action comprises means to shut down the asset having said extraneous electronic circuitry connected thereto.

5. The secure electronic local area network according to claim 1 wherein said means to take action comprises means to send additional voltage to said extraneous circuitry on a frequent, but irregular schedule known only to the valid members of the network.

6. The secure electronic local area network according to claim 1 wherein said means to take action comprises means to isolate network segment in which said extraneous circuitry is detected.

7. The secure electronic local area network according to claim 1 wherein said means to take action comprises means to monitor said extraneous circuitry for security purposes.

8. A method for providing peripheral security to a local area network connected to an external network comprising
monitoring the physical wiring plant of said computer local area network (LAN) in order to detect the presence of extraneous electronic circuitry placed onto that physical wiring which were not originally designed as part of the electronic circuitry of that LAN,
reporting the presence of that additional electronic circuitry, and
taking action against that additional electronic circuitry, said extraneous electronic circuitry originating from said external network, wherein said action further comprises:
detecting intruder(s) presence through the application of Kirchoff's theorem, Thevenin's equivalent theorem and Norton's theorem, combined with the fact that the rise and fall of the characteristic time constant, $\tau$, as measured by using circuit values including voltage and current, in response to a transient that is asymptotic and the values begin to rapidly change soon after the transient is applied and settles down over time, wherein the value $\tau$ is reflective of the network signature, including the attached nodes at any time.

9. The method according to claim 8 wherein said action comprises sending crypto-nulls to said extraneous circuitry.

10. The method according to claim 8 wherein said action comprises disconnecting or shutting down the local area network.

11. The method according to claim 8 wherein said action comprises sending additional voltage to said extraneous circuitry on a frequent, but irregular schedule known only to the valid members of the network.

12. The method according to claim 8 wherein said action comprises isolating network segment in which said extraneous circuitry is detected.

13. The method according to claim 8 wherein said action comprises monitoring said extraneous circuitry for security purposes.

14. The method according to claim 8 wherein said extraneous electronic circuitry is detected by:
a. determining the base electronic signature of said local area network;
b. determining the electronic signature of said local area network at random times; and
c. comparing the electronic signature of said local area network determined at random time with the base electronic signature of said local area network.

* * * * *